March 18, 1952

W. A. AYRES 2,589,216

AIRCRAFT APPARATUS FOR SIMULATING A LINE
OF SIGHT-DEFINING STRUCTURE

Filed Nov. 23, 1943

INVENTOR
W. A. AYRES
BY
*Paul B. Hunter*
ATTORNEY

INVENTOR
W. A. AYRES
BY
ATTORNEY

March 18, 1952 W. A. AYRES 2,589,216
AIRCRAFT APPARATUS FOR SIMULATING A LINE
OF SIGHT-DEFINING STRUCTURE
Filed Nov. 23, 1943 4 Sheets-Sheet 4

INVENTOR
W. A. AYRES
BY
ATTORNEY

UNITED STATES PATENT OFFICE 2,589,216

AIRCRAFT APPARATUS FOR SIMULATING A LINE OF SIGHT-DEFINING STRUCTURE

Waldemar A. Ayres, Kew Gardens Hills, N. Y., assignor to The Sperry Corporation, a corporation of Delaware Application November 23, 1943, Serial No. 511,418

11 Claims. (Cl. 343—11)

This invention relates, generally, to indicators which reveal, on a single face, information collected from a plurality of sources and, more particularly, to novel cathode ray indicator means wherein a simulation of a line-of-sight-defining structure is altered in aspect in accordance with the information supplied by a plurality of aircraft instruments. The line-of-sight-defining structure may conveniently be represented by a series of similar figures or stereoscopic range indices.

Flight indicators have been disclosed in U. S. Patent 2,262,033 for "Aircraft Flight Indicator and Control System Therefor," issued November 11, 1941, in the name of Francis L. Moseley and U. S. Patent 2,262,245 for "Cathode Ray Flight Indicator," issued November 11, 1941, in the names of said Moseley and Joseph Lyman wherein individually distinctive patterns, representative of several instruments responsive to flight conditions, are traced on a cathode ray tube in rapidly repeated sequence to cause the patterns to be simultaneously visible, said patterns collectively constituting, under normal flight conditions, a symmetrical assembly whose symmetry is destroyed under abnormal flight conditions according to the responses of said several instruments. Although these indicators have greatly advanced the art of instrument flying, they suffer from certain limitations. The various patterns employed in the prior art indicators are arbitrarily related, and since they do not have any physical counterparts, the patterns are not instinctively comprehensible. The amount of information which may be imparted by such indicators is severely limited by the possibility of confusion on the part of the pilot. There is also no provision in the prior art for the indication of distance information.

It is, therefore, one of the objects of the present invention to provide flight and navigational information in a picture created by cathode ray indicator means analogous to familiar physical situations wherein long established habit patterns may be employed by a pilot to increase the ease and accuracy of instrument flying.

Another object of the present invention is to provide a flight path indication on a cathode ray tube simulating a line of sight simulating a physical structure such as a tunnel, road, fence or the like, which simulated presentation serves to convey such information as the position, attitude, and distance travelled of an aircraft with respect to the desired flight path.

Yet another object lies in the provision of a flight path indication on a cathode ray tube wherein a single substantially perspective simulated view of a line-of-sight-defining object serves to clearly convey flight information from a plurality of instruments whose outputs may be suitably combined without the necessity of commutating between said outputs to prevent confusion.

Still another object is to provide means for steroscopically displacing simulated presentations for causing the flight indication to have apparent depth thus enhancing the realistic effect.

Another object is to provide the flight indication in the form of stereoscopic range indices adapted to reveal the distance of an aircraft from a desired point such as an airport.

Other objects and advantages will become apparent from the specification, taken in connection with the accompanying drawings wherein the invention is embodied in concrete form.

Figures 5, 9:
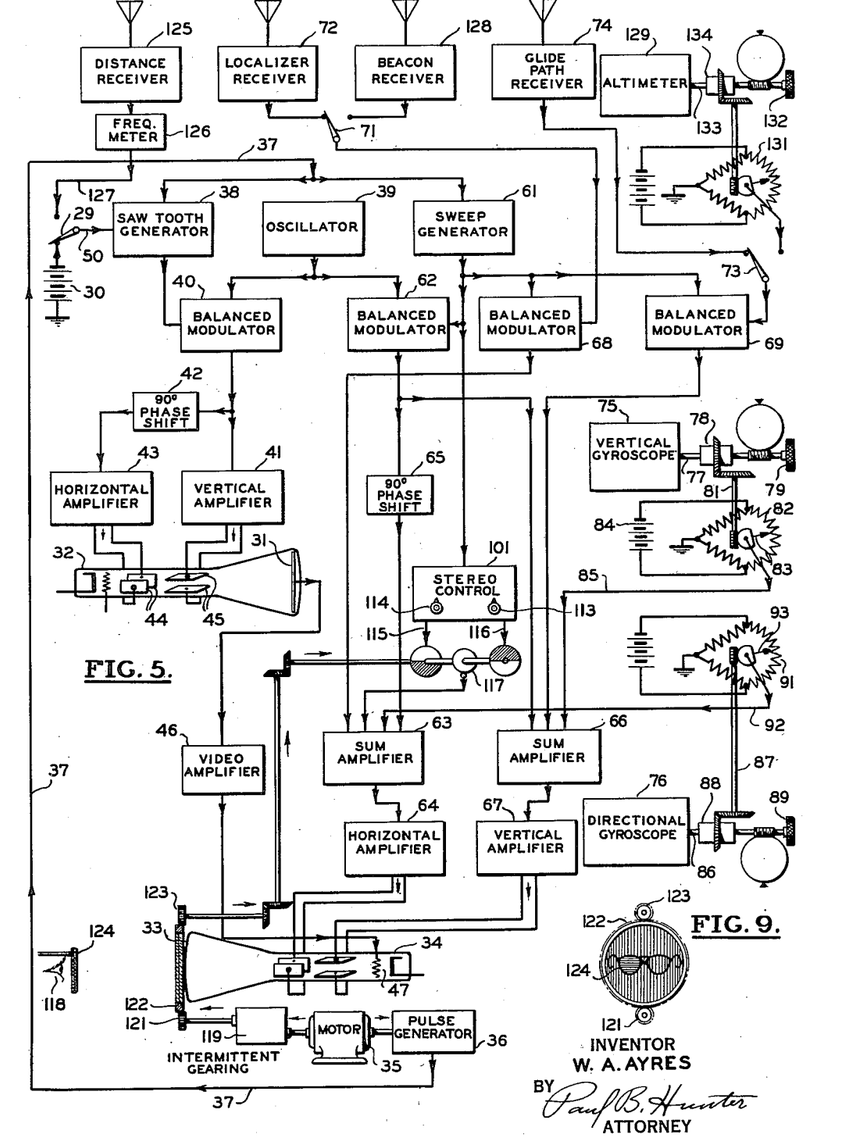
Fig. 5 is a block schematic diagram of an embodiment of the present invention.
Fig. 9 is a view of a detail of an indicator employed in the structure of Fig. 5.

In the drawings,

Similar characters of reference are used in all of the above figures to indicate corresponding parts. In Fig. 5 arrows are provided to indicate the direction of the control or energy flow.

The essence of the present invention is to provide an observer on an aircraft with an oscilloscopic pattern simulating a line-of-sight-defining physical structure, which pattern is synthesized from locally generated electrical potentials appropriately modified by various flight instruments in response to deviations from desired flight conditions with the result that the pattern is altered in aspect according to the alteration in appearance that would occur if the imaginary structure actually existed in space. The means for producing this illusion may take many forms and provide varying degrees of realism according to the complexity of the apparatus employed and the requirements of the particular application.

Figure 1:
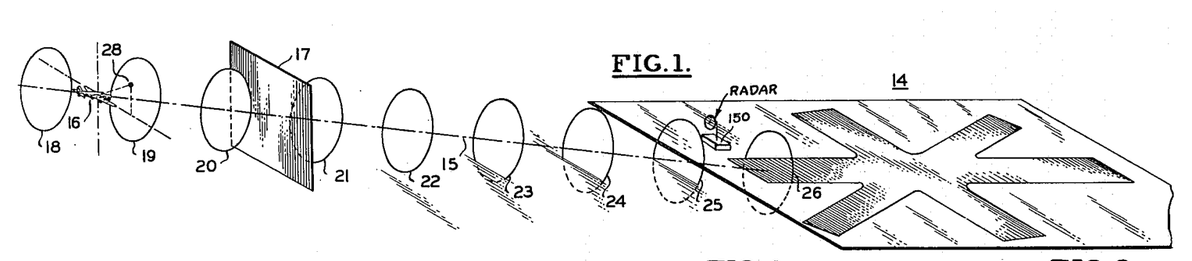
Fig. 1 is an oblique view of an airport illustrating an imaginary tunnel of rings defining a landing path for an aircraft.

The flight indication may be made to simulate a tunnel, a road, a fence, or some such line-of-sight-defining object. The spatial structure chosen for indication by the illustrated embodiment of the present invention comprises a tunnel of equal diameter rings having uniform spacing therebetween. This tunnel is illustrated in Fig. 1 where it is employed to guide an aircraft at a point 16 down a flight path 15 to an airport 14. The flight path may be conveniently defined by the intersection of horizontal and vertical equisignal spatial planes produced by partially overlapping glide path and localizer beams, respectively. The rings indicated by reference numerals 18 through 26 are perpendicular to the correct line of flight 15 and, according to one aspect of the invention, the aircraft apparently flies through the center of each ring successively as it progresses along its desired course.

The physical structure may be depicted according to any desired method of graphical projection; however, parallel perspective has been chosen for simplicity in the present instance to reproduce the tunnel from a variable station point. The picture plane indicated by reference numeral 17 in Fig. 1 is maintained at a desired constant perpendicular distance from the station point. The picture plane is kept in the plane of the tunnel cross-section; consequently all circles remain circular irrespective of the position of the station point. Parallel perspective also has the simplification that all transverse dimensions of the tunnel segments are reproduced as inverse functions of the actual distance between the segments and the station point. Thus all dimensions lying in the picture plane are true, while the reproduced size of each ring is inversely proportional to its distance.

The spatial structure may be represented as viewed from either the objective or the subjective viewpoint. The objective viewpoint is characterized by the assumption that the aircraft always lies at the center of the picture plane, where it may be represented by a miniature silhouette, and the observer is conceived as viewing the aircraft from a station point which lies behind the craft on its longitudinal axis. This viewpoint is an extension of that employed in the indication provided by a conventional artificial horizon gyroscope. Thus from the objective viewpoint, the observer sizes up the relationship of the aircraft and the tunnel as seen from a vantage point in space. The subjective viewpoint employed in the present embodiment, on the other hand, represents the tunnel as seen from a station point situated at the aircraft, and the pilot views a pattern similar to that which would be actually observable from the aircraft cockpit if the spatial structure had physical reality.

The present embodiment of the invention illustrates the employment of several conventional flight instruments in changing the appearance of a tunnel from the subjective viewpoint. Flight angles with respect to the tunnel's axis of symmetry are indicated from this point of view by controlling the position of the perspective vanishing point in relation to the center of the picture plane. The entire pattern is shifted in a direction opposite to the deviation to which the aircraft is subjected, and by an amount proportional to the tangent of the deviation angle. Thus the center of the indicator always represents the direction in which the craft is heading.

The transverse position of the aircraft with respect to the desired flight path is indicated by appropriately altering the tunnel appearance, while maintaining the vanishing point at the center of the indicator. The transverse displacements of tunnel segments are inversely proportional to their distance from the aircraft and in an opposite direction to the displacement of the craft. Tunnel rings lying in the picture plane are shifted an amount equal to the aircraft displacement. Thus, for example, if a pilot is to the right of his course, the tunnel is no longer centered on the indicator, but the aircraft apparently flies near the right side of the tunnel. A large displacement from the predetermined flight path places the craft on the tunnel edge or even outside it.

Roll angle may also be indicated, if desired, by a rotation of the entire pattern about the sighting line, that is, about the center of the indicator. When the roll angle is shown, the tunnel is made elliptical or otherwise changed from a circular cross-section to distinguish the horizontal axis.

Figures 2, 3, 4A, 4B, 6, 7, 8:
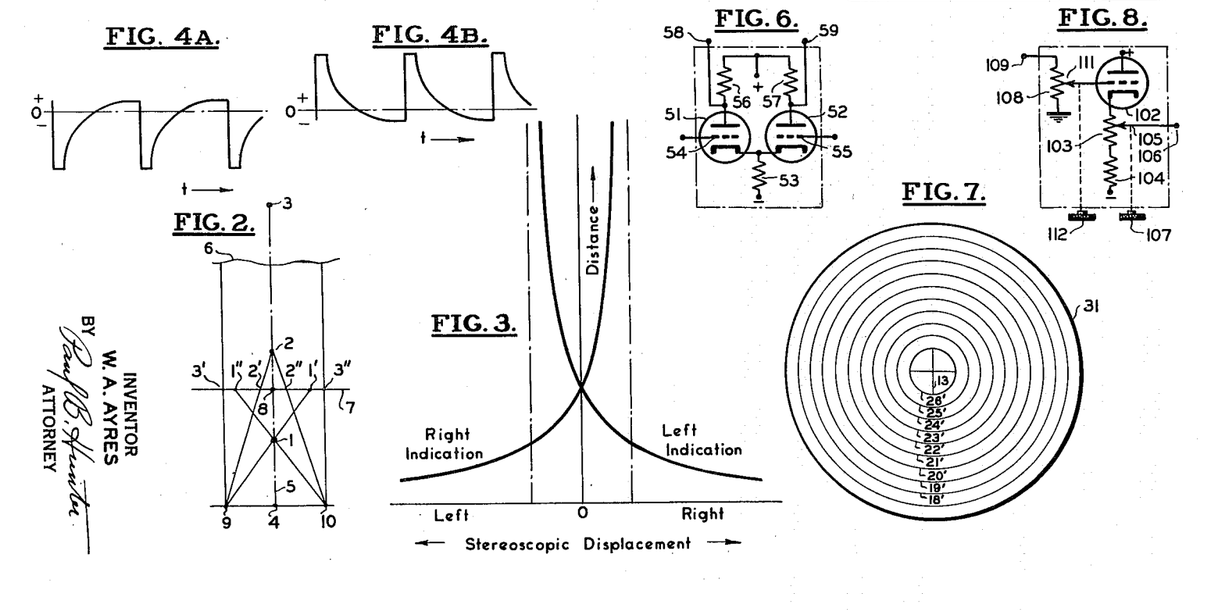
Fig. 2 is a diagram illustrating stereoscopic displacement.
Fig. 3 is a graph of the stereoscopic displacement of an image on an indicator screen as a function of the apparent distance from the viewpoint to the corresponding object.
Figs. 4A and 4B are oscillographs of time sweep waves corresponding to the stereoscopic displacement curves of Fig. 3.
Fig. 6 is a schematic wiring diagram of a push-pull output amplifier having two single-ended inputs.
Fig. 7 is a plan view of an electron target screen having a basic tunnel pattern printed thereon.
Fig. 8 is a schematic wiring diagram of a gain and direct voltage level control.

The flight indication may be presented as a flat pattern but for greatly increased realism and intelligibility, the illustrated embodiment of the invention provides stereoscopic relief. The theory underlying the stereoscopic representation of the present invention may be more readily understood by reference to Figs. 2 and 3. In Fig. 2 objects symbolized by dots 1, 2, and 3 lie at distances increasing in numerical order from a viewpoint 4. For clarity and simplicity of illustration, all the objects are assumed to be on the same line of sight 5. This line is broken at 6 to show that object 3 lies at an extremely great distance. Now assume a surface 7 at some distance from the viewpoint 4. The points at which the lines of sight to objects pierce the surface 7 may be termed the goniometric positions of images of objects as represented on surface 7. The goniometrically positioned images corresponding to objects 1, 2, and 3 are coincident at a point 8. It is seen that all objects having the same bearing from a singular viewpoint possess images whose goniometric positions superimpose irrespective of the distance to the corresponding objects.

Assume now that viewpoint 4 is replaced by imaginary left and right viewpoint 9 and 10, respectively, separated by an effective interocular distance. Left and right rays passing through the objects pierce the surface 7 to form dual images, 1', 2', and 3' for the left viewpoint 9, and 1'', 2'', and 3'' for the right viewpoint 10. It is seen that images 1' and 1'' corresponding to object 1 lying in front of the surface 7 are displaced from the goniometric position 8 to the right and left, respectively, while images 2' and 2'' corresponding to object 2 lying beyond surface 7 suffer a reverse displacement from the goniometric position 8, being to the left and right, respectively. Images corresponding to objects lying on the surface 7 would not be displaced from the goniometric position. Since object 3 is assumed extremely distant, left and right rays to this object are substantially parallel to sighting line 5, and images 3′ and 3″, therefore, have substantially the same separation as points 9 and 10, that is, the effective interocular distance. The lateral displacement of images from their goniometric positions caused by the assumption of imaginary right and left viewpoints may be called stereoscopic displacement and varies according to distance. Fig. 3 illustrates the general relationship between stereoscopic displacement of images and distance of the corresponding objects from the viewpoint 4. The curves take the shape of equilateral hyperbolas, that is, the amplitudes are inversely proportional to distance.

A stereoscopic indication of objects 1, 2, and 3 may be achieved by providing an indicator screen having images thereon positioned similarly to those on surface 7 where images 1′, 2′, and 3′ are visible only to the left eye of an observer while images 1″, 2″, and 3″ are perceived only by the observer's right eye. Images seen by the left eye are paired in the observer's brain with complementary images seen by the right eye, and the fusion results in a perception of depth relationships between the objects 1, 2, and 3. The present embodiment of the invention utilizes a cathode ray indicator upon whose screen images are positioned by electron beam deflecting potentials.

Figs. 4A and 4B illustrate suitable periodic beam deflecting potentials having amplitudes corresponding to the stereoscopic displacements and recurrent times corresponding to the distances of the curves of Fig. 3. These curves represent the realistic relationship between displacement and distance but may often be adequately approximated by an exponential or linear shape over the desired distance limits. The maximum amplitude of the time sweep wave determines the stereoscopic contrast between nearest and furthest images while the average value or direct voltage component determines the apparent distance to the indicator face. It is preferable that the time sweeps employed for the right and left eye indications be equal and opposite to avoid distortion of the apparent bearings of objects.

Referring now to Fig. 5, the basic flight indication exists as a two-dimensional pattern formed on a target screen 31 in a picture source cathode ray tube 32. This pattern is analyzed in terms of video signals and scanning potentials and is reproduced on the face 33 of a cathode ray indicator 34. The beam deflecting potentials of tube 34 are synchronized with the scanning potentials of tube 32 and so modified by position and angle responsive flight instruments and by stereoscopic displacement waves that when seen through suitable viewing means a synthesized stereoscopic flight indication results.

A constant speed synchronizing and driving motor 35 motivates a pulse generator 36 which supplies periodic sharp electrical impulses over a lead 37 to a saw-tooth generator 38. The generator 38 is adapted to produce a constant slope wave which commences at the termination of the pulse from the synchronizing device 36 and reduces to zero during the time interval between recurrent pulses. The maximum amplitude of the sawtooth wave is determined by a direct potential supplied to the generator 38 over a lead 50. The lead 50 is shown connected to a constant voltage source 30 by a double throw switch 29. The current discharge rate of generator 38 is maintained constant as by a pentode load irrespective of the initial sweep amplitude. The sawtooth, therefore, falls to zero voltage in a time proportional to this initial value. The generator 38 is connected to the push-pull input of a balanced modulator 40.

An oscillator 39 provides a substantially constant frequency and amplitude sinusoidal wave having a frequency of several hundred times that of the saw-tooth generator 38. This sinusoidal wave is supplied to the parallel input of balanced modulator 40 where its amplitude is effectively modulated by that of the saw-tooth wave. The varying output of modulator 40 is applied to a vertical deflection amplifier 41 and also through a 90° phase shifter 42 to a horizontal deflection amplifier 43 of the tube 32.

Amplifiers 41 and 43 may conveniently be of the type shown in Fig. 6, having a push-pull output and two single-ended inputs. Here two tubes 51 and 52, have in common a high resistance cathode load 53 maintained at a large negative potential. A signal applied to either control grid 54 or 55 appears across plate resistors 56 and 57 with opposite polarity and substantially equal magnitude. Cathode ray deflecting electrodes coupled directly to leads 58 and 59 displace the electron beam according to the sum of the impressed voltages whether they are alternating or direct. The operating potential for tubes 51 and 52 being the same on each deflecting electrode causes no beam deflection. One of the grids 54 or 55 is supplied by the scanning wave, while the other grid is fed a constant voltage.

The waves supplied horizontal and vertical beam deflecting electrodes 44 and 45, respectively, in tube 32 are of substantially equal amplitude but in phase quadrature. The beam in picture source tube 32 is, therefore, scanned circularly with a diameter that is proportional to the sawtooth modulation. The sweep starts with a diameter dependent upon the maximum amplitude of the saw-tooth and sweeps spirally inward to the center, only to return to the outside at the commencement of a new cycle.

The tube 32 projects a constant intensity electron beam at the target screen 31 placed perpendicularly to the axis of the tube. The screen 31 is preferably made of material having a high secondary emission ratio such as aluminum foil coated with natural oxide. The basic tunnel pattern is printed on the surface of screen 31 in carbon ink, or other material having a secondary emission ratio appreciably different from the natural oxide. The pattern is shown in Fig. 7 to comprise a plurality of linearly spaced circular concentric rings which may have distinctive reference numerals associated therewith. Printed rings 18′ through 26′ correspond to imaginary tunnel segments 18 through 26, respectively, illustrated in Fig. 1. The center of the pattern may be further defined by a reference cross 13. Variations in the secondary electron emission current from the pattern as the screen 31 is scanned, produce video signals corresponding to the indices to be reproduced. Since the difference in magnitudes of the secondary electron emission determines the video current, it is possible to develop a greater signal than would be provided by the use of the primary current of the electron beam alone. A video amplifier 46 amplifies the picture potentials generated by the tube 32 and supplies these waves in amplified form to the control grid 47 of the indicator tube 34.

A sweep circuit 61 which preferably produces a hyperbolic shaped wave similar to that shown in Figs. 4A or 4B is triggered by the pulse generator 36 synchronously with the saw-tooth generator 38. The sweep circuit 61 supplies the signal input of a balanced modulator 62 to whose carrier input the wave from oscillator 39 is applied. Modulator 62 is similar to modulator 40, but because of the difference in the modulation signal, its output has an envelope which periodically varies inversely, rather than linearly with time. The modulated wave from device 62 is supplied through a sum circuit 66 to a vertical deflection amplifier 67. The wave is also applied through a 90° phase shifter 65 to a sum circuit 63, connected to a horizontal deflection amplifier 64. Amplifiers 64 and 67 correspond to amplifiers 43 and 41, respectively, and are designed to deflect the electron beam produced in the indicator tube 34, in accordance with the applied deflecting potentials. The pattern drawn on the target screen 31 appears on the indicator face 33 with a spacing between the reproduced rings that is in accordance with a perspective representation of the tunnel because of the difference between the sweep potentials in tubes 32 and 34.

The nonlinear sweep circuit 61 also is connected to the parallel inputs of balanced modulators 68 and 69 which under normal conditions produce no output voltage. A double throw switch 71 connects the direct voltage output of a standard localizer receiver 72 to the push-pull signal input of balanced modulator 68, while a double throw switch 73 connects the direct voltage output of a conventional glide path receiver 74 to the push-pull signal input of modulator 69. As is well known, the outputs of glide path and localizer receivers are zero when an aircraft is on an equi-signal course, but any displacement therefrom causes positive or negative potentials to be produced depending on whether the aircraft is above or below, or to the right or left of the correct flight path. Under these unbalanced conditions modulators 68 and 69 supply curvilinear sweep potentials to sum circuits 63 and 66, respectively, of a polarity and with a maximum amplitude in accordance with the error signals from receivers 72 and 74, respectively. As a result of the common timing of the various deflecting potentials, the segments of the tunnel are displaced in proportion to their size and, therefore, in substantially inverse proportion to their apparent distance from the aircraft in a most realistic manner.

A vertical gyroscope 75 and a directional gyro 76 are employed to introduce pitch and yaw corrections in the synthesized flight indication. A shaft 77, responsive to pitch of the craft as referred to a stabilized horizon provided by the gyroscope 75, supplies an input of a differential mechanism 78 into which is also introduced the angular position of a suitably calibrated pitch adjustment knob 79. The differential 78 has an output shaft 81 which indicates the difference between the reference angle as set in by knob 79 and the pitch of the craft with respect to the horizontal plane as indicated by the position of shaft 77. Shaft 81 rotates a contact arm 83 on a center-grounded potentiometer 82 which is energized from a direct voltage source 84. A lead 85, attached to the contact arm, supplies a potential tapped off from potentiometer 82 to the sum circuit 66. The potentiometer 82 is preferably wound so as to provide a voltage proportional to the tangent of the angle through which shaft 81 is turned. The resulting change in the average beam position on the face 33 of the indicator 34 is such as to realistically reproduce any pitch of the aircraft with respect to the axis of the imaginary tunnel.

The directional gyroscope 76 actuates an azimuth shaft 86 which drives a shaft 87 through a differential 88 in a corresponding manner as does gyroscope 75. The desired course is set into the differential by calibrated course setting knob 89, and a potentiometer 91, identical to device 82, supplies a voltage over a lead 92 from contact arm 93, which is proportional to the tangent of the azimuth deviation angle. This yaw voltage is applied to the sum circuit 63 and alters the flight indication along the horizontal axis in a similar manner as the pitch voltage affects the vertical axis.

The desired stereoscopic effect is obtained by deriving stereoscopic displacement waves from the output of sweep circuit 61 and applying them to tube 34 in synchronism with suitable viewing means. A stereoscopic control 101 is supplied this non-linear wave. The control circuit 101 feeds the applied wave in push-pull phase relationship to two cathode follower stages, each similar to one illustrated in Fig. 8. The cathode follower stage shown in Fig. 8 comprises a tube 102 attached to a cathode load consisting of a voltage divider 103, in series with a fixed high value resistor 104, the combination being connected to a source several hundred volts negative with respect to ground. The mid point of the voltage divider 103 is approximately at ground potential. An adjustable tap 105 is electrically connected to an output lead 106 and mechanically adjusted by a direct voltage level control knob 107. A voltage divider 108 is connected between an input lead 109 and ground. An adjustable tap 111 connects to the control grid of the tube 102 and provides a means of amplitude control through mechanically attached knob 112.

The stereoscopic control 101 is provided with knob 113 to allow simultaneous adjustment of the amplitude of the stereoscopic displacement waves passing through its two cathode follower stages. These waves are, of course, of small magnitude compared to the similar shaped waves applied to modulators 62, 68 and 69. Control circuit 101 is further provided with a knob 114 to facilitate alteration of the direct voltage level of these waves by preferably equal and opposite amounts. One stage of the circuit 101 has an output lead 115 upon which its stereoscopic displacement wave is impressed, while the parallel output stage of the circuit 101 has an output lead 116 to which the substantially mirror image of the above wave is supplied. Leads 115 and 116 are alternately connected through a commutator 117 to an input of the sum circuit 63. It is arranged, as will be seen, that the opposite stereoscopic waves are supplied on alternate scannings of the cathode ray tube 34. During one frame, the tunnel is suitably modified for viewing by one eye, while during the next cycle the tunnel is modified in the opposite direction for viewing by the opposite eye. These indications are repeated at a rate sufficiently high to avoid flicker, and viewing means are provided to enable an observer at a viewpoint 118 to see these indications as a unified three-dimensional picture.

The following viewing means may be employed to permit the right and left eye of the observer to see only the indications intended for the respective eyes, the left eye indication being obscured from the right eye, and vice versa. The motor 35, besides actuating the pulse generator 36, also operates an intermittent motion mechanism 119, such as a Geneva movement. The mechanism 119 has a driving pinion 121 which engages a ring gear 122 supported parallel and concentric with the indicator face 33 by suitable bearings (not shown). The ring gear, 122 shown more clearly in Fig. 9, acts as a supporting frame for a polarizing screen held before the face of the tube 34. This screen may be made of a commercially available transparent sheet adapted to plane polarize the light it transmits. The oscilloscopic picture as viewed through this screen is, therefore, optically polarized in a plane corresponding to the angle of rotation of this screen about the line of sight.

The intermittent motion mechanism 119 is adapted to rotate or oscillate this screen by means of gearing 121 and 122, in steps of a quarter revolution. The commutator 117 is mechanically synchronized with this motion by means of a pinion 123 and attached gears and shafting. The plane of polarization, for example, may be vertical and horizontal successively for the major portion of the time and may pass through intermediate angles very rapidly.

If the face 33 is observed from the viewpoint 118 through polarizing eye glasses, indicated at 124, the right and left lenses transmitting only vertical and horizontal polarizing light, respectively, the observer's right and left eyes respond only to those indications intended for these eyes. The dual images corresponding to each tunnel segment are fused in the brain of the observer and provide a three-dimensional picture. It is to be understood that other viewing means, such as a separate indicator for each eye, may be alternatively employed.

The flight indication of the present invention is equally as useful in straight line flying as in instrument landing applications. For constant altitude flying, a beacon receiver 128 is substituted for the localizer receiver 72 by turning switch 71 to the alternate position, while an altimeter 129 takes the place of the glide path receiver 74 upon throwing the switch 73 to the opposite side. The altitude signal is obtained by tapping-off a voltage from a voltage divider 131 in accordance with the difference between a reference altitude as set by a calibrated knob 132 and the actual altitude as supplied by the angular position of a shaft 133 actuated by the altimeter 129. This difference is shown as obtained mechanically through the employment of a differential 134.

The apparent distance of the aircraft from the tunnel rings is constant according to the above discussed mode of operation. The present embodiment of the invention, however, provides alternate means for enhancing the realism of the indication and for supplying further flight information by causing the aircraft apparently to fly through the tunnel. The tunnel segments are thus given further significance by acting as range or distance indices.

A radio object detecting and distance measuring system, in this instance comprising the radar equipment 150, is situated at the airport 14. This system sends out pulses which are reflected from the aircraft and are returned to the airport. The transit time between transmission and reception of the reflected pulses is measured according to any well known method and a radio carrier wave is modulated by an audio frequency that is proportional to the distance between the aircraft and the landing field. A distance receiver 125 on the aircraft receives and detects this distance denoting wave and supplies the same to a frequency meter 126 of an electronic type adapted to provide a direct voltage proportional to the applied frequency. This distance dependent potential is fed over lead 127 and introduced to the saw tooth generator 38 when the switch 29 is placed in the upper position. The excursion of the electron beam sweep in picture source tube 32 is, therefore, controlled in direct proportion to the distance of the aircraft from the airport.

When the aircraft commences an instrument approach, the distance is at a maximum and so is the diameter of the sweep on target screen 31. As the aircraft progresses fewer and fewer rings are scanned. Since the sweep of the indicator tube 34 always covers the entire face 33, the first ring scanned on target 31 inevitably appears the nearest and largest as reproduced.

The spacing between adjacent rings on the pattern is made to correspond to a predetermined physical distance between adjacent tunnel segments in space. As the aircraft progresses, the rings on the indicator 34 appear to approach, continually growing larger until the nearest ring attains the size of the face 33 and disappears from view. The remaining rings continue to grow in size until they in turn expand beyond the tube face and the last ring is passed indicating, for example, the crossing of the airport boundary. The pilot keeps the reference cross in the center of his field of view and this procedure will result in a contact landing on the field itself. Not only does the flight indication reveal the distance of the aircraft from the airport, but the rate of movement of the tunnel gives a correct sense of ground speed.

The following drawings are based upon the flight indicating principles disclosed above and graphically illustrate the novel and realistic operation of the present embodiment of the invention.

Figure 10:
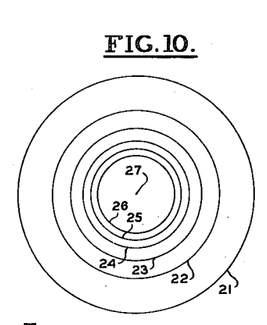
Figs. 10 and 15 are parallel perspective drawings of the imaginary tunnel shown in Fig. 1; nd

Fig. 10 is a parallel perspective drawing of the tunnel as seen from the viewpoint 16 on the axis of symmetry 15 and projected upon the picture plane 17. Rings 19 and 20, lying in front of plane 17, are too large to appear. The nearest visible ring 21 is one half a ring spacing behind the picture plane while the viewpoint 16 is maintained two ring spacings in front of this plane. The vanishing point is indicated by reference numeral 27.

Figure 11:
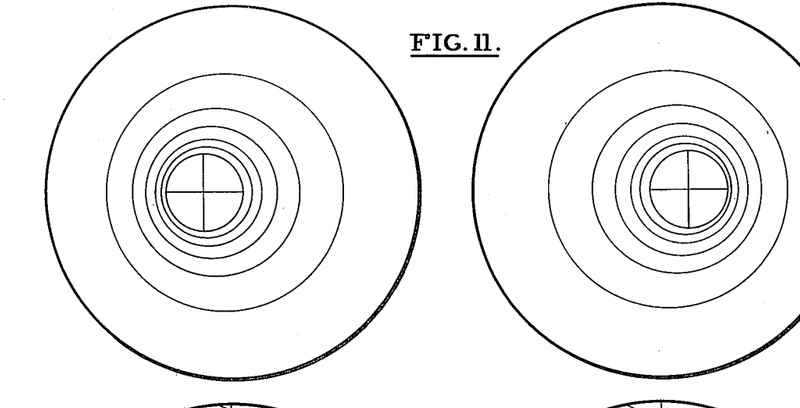
Figs. 11 through 14 are stereoscopic drawings illustrating some of the possible flight indications provided by the present invention and which may be observed in three-dimensional relief by means of an ordinary stereoscope.

Fig. 11 corresponds to Fig. 10, but is stereoscopically displaced to obtain three-dimensional relief. The left and right pictures correspond to the reproductions alternately created on the indicator face 33, for left and right eyes, respectively. These two pictures may be fused into a three-dimensional whole when observed through an ordinary stereoscope. Upon thus viewing Fig. 11, the first ring appears one half a ring spacing behind the surface of the paper and the remainder of the tunnel extends with uniform steps into the background.

Figure 12:
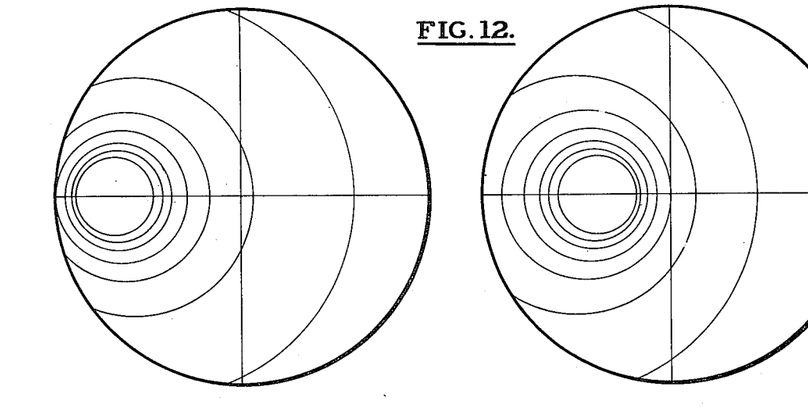

Fig. 12 is taken from the same viewpoint as Figs. 10 and 11 but indicates a 30° turn of the aircraft to the right. A portion of ring 20 was not previously visible because its diameter is greater than the face of oscilloscope 34. Cross hairs are shown marked on the tube face as an aid in defining the sighting line or heading of the aircraft.

Figure 15:
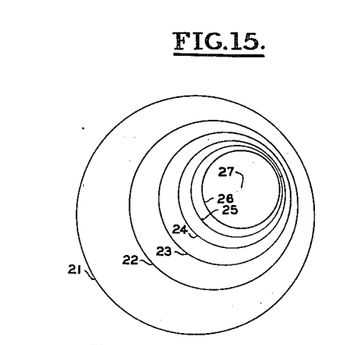

Fig. 15 is a perspective drawing of the rings as seen from a viewpoint 28 shown in Fig. 1, lying above and to the right of point 16.

Figure 13:
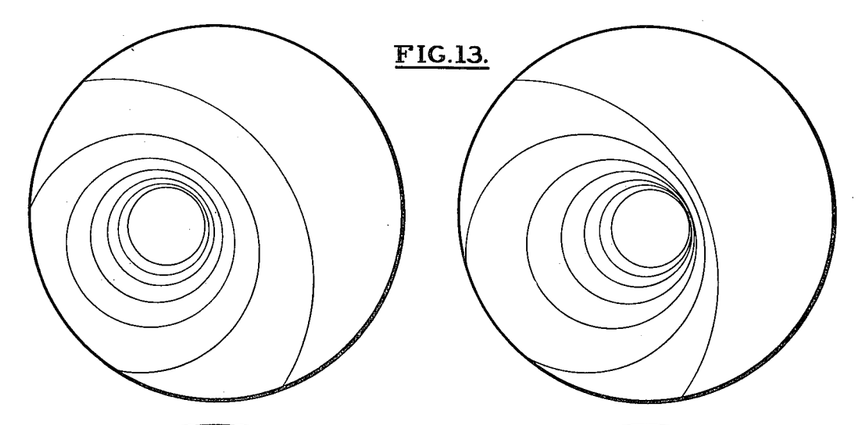

Fig. 13 is a stereoscopic view corresponding to Fig. 15.

Figure 14:
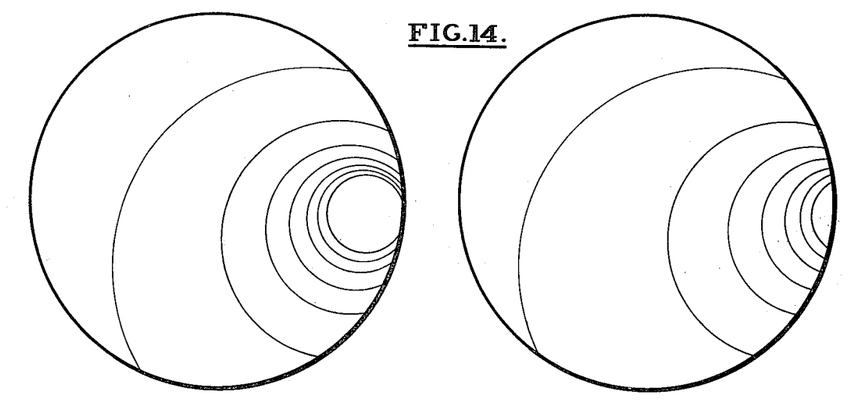

Fig. 14 is a stereoscopic view taken from the point 28 shown in Fig. 1 and is similar to Fig. 13 except that here the aircraft is subjected to a 45° left turn in order to regain the center of the tunnel and thus the on-course position.

It is evident that the present invention discloses a flight indication to which a pilot or observer has instinctive and automatic reactions. The flight instruments present their information in the form of a convincing and realistic illusion and thus enable use to be made of long established habit patterns, resulting in increased safety, ease, and accuracy of instrument flying.

Since the present type of flight indication may be produced by many types of line-of-sight-defining structures, be presented from several points of view, and respond to diverse combinations of attitude and position indicators, it is intended that all matter contained in the above description or shown in the accompanying drawings shall be interpreted as illustrative and not in a limiting sense.

What is claimed is:

1. Apparatus mountable on an aircraft as a navigational aid comprising cathode ray indicator means, means for forming range indices on said indicator means, means for stereoscopically displacing said indices, instrument means responsive to flight conditions, and means for translating the responses of said instrument means into electron beam deflection potentials adapted to control the positions of said indices in accordance with said responses.

2. Apparatus mountable on an aircraft as a navigational aid comprising, cathode ray indicator means, means for forming range indices on said indicator means, means responsive to a reference position for altering the apparent size of said indices in accordance with movement of said aircraft with respect to said position, means for stereoscopically displacing said indices, instrument means responsive to flight conditions, and means for translating the responses of said instrument means into electron beam deflection potentials adapted to control the positions of said indices in accordance with said responses.

3. Apparatus mountable on an aircraft as a navigational aid comprising, cathode ray indicator means, means for forming range indices on said indicator means, means responsive to a reference position for altering the apparent size of said indices in accordance with movement of said aircraft with respect to said position, instrument means responsive to flight conditions, and means for translating the responses of said instrument means into electron beam deflection potentials adapted to control the positions of said indices in accordance with said responses.

4. A distance indicator mountable on a mobile craft comprising a viewing screen, means for depicting a series of similar figures of graded sizes on said screen, positioning means for arranging said figures to form a substantially perspective picture, means for altering the sizes of said figures in accordance with the distance of said craft from a reference position, and means for stereoscopically displacing said figures in accordance with their sizes.

5. A distance indicator mountable on a mobile craft comprising a viewing screen, means for depicting a series of similar figures of graded sizes on said screen, positioning means for arranging said figures to form a substantially perspective picture, means for stereoscopically displacing said figures, and means for controlling the stereoscopic displacement of said figures in accordance with the distance of said craft from a reference position.

6. Apparatus mountable on an aircraft as an aid in piloting the craft comprising instrument means having output signals responsive to flight conditions, cathode ray indicator means having electron beam deflecting means, an electron beam tube containing means providing an electron beam and an electron target screen having a pattern comprising concentric circles of varied sizes represented thereon, scanning means for analyzing said pattern to produce video signals representative thereof, means responsive to said scanning means and said video signals for reproducing an oriented version of said pattern on said indicator means, and means for applying the signals of said instrument means to said electron beam deflecting means to control the position and perspective of said reproduced pattern in accordance with said responses.

7. Apparatus mountable on an aircraft as an aid in piloting the craft comprising instrument means having output signals responsive to flight conditions, cathode ray indicator means having electron beam deflecting means, an electron beam tube containing means providing an electron beam and an electron target screen having a pattern comprising concentric circles represented thereon, scanning means for analyzing said pattern to produce video signals representative thereof, means responsive to said scanning means and said video signals for reproducing a version of said pattern on said indicator means, means for applying the signals of said instrument means to said electron beam deflecting means to control the position and perspective of said reproduced pattern in accordance therewith, and means responsive to said output signals for controlling the relative sizes of the represented and reproduced patterns as a function of the distance of said apparatus from a reference position.

8. Apparatus mountable on an aircraft as an aid in piloting the same comprising in combination, attitude instrument means responsive to the orientation of said aircraft about at least one axis, position instrument means responsive to departure of said aircraft from a predetermined flight path, a viewing screen, means for creating a series of outlines on said screen, positioning means for arranging said outlines to form a picture defining a vanishing point and a viewpoint, and control means substantially simultaneously controlling the positions of said outlines in response to both of said instrument means to alter said vanishing point and said viewpoint in accordance with flight conditions.

9. Apparatus mountable on an aircraft as a navigational aid comprising in combination, attitude instrument means responsive to departure from a normal orientation, position instrument means responsive to departure from a normal flight path, a viewing screen, means for creating a series of outlines on said screen, positioning means for arranging said outlines to represent a line-of-sight-defining object, and control means for substantially simultaneously controlling the position of each of said outlines in accordance with the joint responses of said attitude and position instrument means whereby the aspect of said object is altered under abnormal flight conditions.

10. A method of indicating navigational information on an aircraft comprising the steps of determining the range of said aircraft from a reference point, creating stereoscopic indices to indicate said range, positioning said indices to form a picture defining a vanishing point and a viewpoint, and altering the position of said indices in accordance with departures from normal flight conditions.

11. Apparatus mountable on an aircraft as an aid in piloting the craft comprising, in combination, instrument means responsive to flight conditions, cathode ray indicator means, means for depicting on said indicator means a simulated glide path comprising a series of circles of various sizes stereoscopically presented, stereoscopic means for viewing said circles whereby a tunnel of equal diameter rings having uniform spacing therebetween appears, and means for translating the responses of said instrument means into electron beam deflection potentials adapted to control the position of said rings and thereby alter the aspect of said simulated glide path in accordance with said responses.

WALDEMAR A. AYRES.

REFERENCES CITED

The following references are of record in the file of this patent:

UNITED STATES PATENTS

| Number | Name | Date |
| --- | --- | --- |
| 2,027,530 | Hammond | Jan. 14, 1936 |
| 2,151,549 | Becker | Mar. 21, 1939 |
| 2,225,046 | Hunter | Dec. 17, 1940 |
| 2,262,033 | Moseley | Nov. 11, 1941 |
| 2,262,245 | Moseley et al. | Nov. 11, 1941 |
| 2,293,899 | Hanson | Aug. 25, 1942 |
| 2,395,966 | Goldberg | Mar. 5, 1946 |
| 2,405,231 | Newhouse | Aug. 6, 1946 |
| 2,408,050 | De Rosa | Sept. 24, 1946 |
| 2,408,848 | Hammond | Oct. 8, 1946 |
| 2,422,100 | Huff | June 10, 1947 |

FOREIGN PATENTS

| Number | Country | Date |
| --- | --- | --- |
| 497,147 | Great Britain | Dec. 9, 1938 |

OTHER REFERENCES

"3 Spots and a Horn," Aviation, September 1938, pp. 28, 29, 73, 74.